United States Patent [19]

Honjo et al.

[11] Patent Number: 4,683,973
[45] Date of Patent: Aug. 4, 1987

[54] OMNIDIRECTIONAL VEHICLE

[75] Inventors: Yoshiaki Honjo; Masaharu Shioya, both of Tokyo, Japan

[73] Assignee: Casio Computer Co., Ltd., Tokyo, Japan

[21] Appl. No.: 846,932

[22] Filed: Apr. 1, 1986

[30] Foreign Application Priority Data

Apr. 10, 1985 [JP] Japan ................................. 60-75568

[51] Int. Cl.⁴ ............................................. B60K 17/30
[52] U.S. Cl. .................................. 180/252; 280/47.11
[58] Field of Search ................ 180/7.1, 252, 253, 255, 180/260, 261, 262, 168, 211; 280/47.11

[56] References Cited

U.S. PATENT DOCUMENTS

| | | | |
|---|---|---|---|
| 3,822,757 | 7/1974 | Spence | 180/255 |
| 4,463,821 | 8/1984 | Falamak | 180/168 |
| 4,573,548 | 3/1986 | Holland | 180/252 |

Primary Examiner—John A. Pekar
Attorney, Agent, or Firm—Frishauf, Holtz, Goodman & Woodward

[57] ABSTRACT

An omnidirectional vehicle having at least three wheels which can be steered in a given directions to allow the vehicle to travel in any direction, comprises a large steering gear horizontally and rotatably mounted at a body, a motor for driving the large steering gear, steering shafts numbering the same as the wheels, extending vertically around the large steering gear and adapted to rotatably support the wheels at lower ends of the steering shafts, and small steering gears numbering the same as the steering shafts and concentricably fixed to the steering shafts, respectively, so as to mesh with the large steering gear and adapted to rotate the steering shafts upon rotation of the large steering gear to change the steering directions of the wheels. The steering shafts may be hollow shafts. The vehicle may further comprises a large drive gear horizontally and rotatably mounted on the body so as to be concentric with the large steering gear and connected to a drive motor, drive shafts inserted in holes of the hollow shafts so as to be rotatably supported by the hollow shafts, small drive gears meshed with the large drive gear and concentrically fixed to the drive shafts to transmit rotational force from the large drive gear to the drive shafts, and rotational force transmitting gears for transmitting the rotational force from the drive shafts to the wheels while allowing steering of the wheels.

19 Claims, 15 Drawing Figures

OMNIDIRECTIONAL VEHICLE

BACKGROUND OF THE INVENTION

The present invention relates to an omnidirectional vehicle having at least three wheels which can be steered so that the vehicle can travel in any direction.

Conventional vehicles with wheels are classified into two categories: automobile type vehicles, whose front or rear wheels are steered to change the direction in which vehicles travel, and omnidirectional vehicles, whose wheels are all steered in a certain direction so that the vehicle can travel forward, backward, right, left, or diagonally without changing the vehicle position. The conventional automobile type vehicle has a larger turning radius. Since the omnidirectional vehicle can change direction without changing vehicle position or orientation, it is used in, for example, office robots, which must change direction and travel in the narrow spaces between desks, and other vehicle, which must make sharp turns in accordance with a complicated pattern.

A conventional omnidirectional vehicle can change direction by steering a plurality of wheels by independent steering mechanisms using special drive sources.

The conventional omnidirectional vehicle of this type has a steering motor for each wheel and is thus expensive. Since all the wheels must be simultaneously steered in a given direction, the steering motors must be synchronized. Synchronizing control devices are complicated and expensive.

Another conventional omnidirectional four-wheel vehicle has been proposed. This vehicle has a first pair of wheels interlocked for direction change, a second pair of wheels similarly interlocked for direction change, and two steering mechanisms for steering the first and second pairs of wheels. This type of omnidirectional vehicle requires two steering motors and two interlocked steering mechanisms for interlocking the first and second pairs of wheels. Therefore, vehicle cost cannot be greatly reduced. Even in this kind of omnidirectional vehicle, the control device for synchronizing the two steering motors is complicated and expensive.

SUMMARY OF THE INVENTION

The present invention has been made in consideration of the above situation, and has as its object to provide an omnidirectional vehicle wherein all wheels can be simultaneously steered by a single steering motor as a drive source, thus reducing cost and simplifying a steering control device.

In order to achieve the above object of the present invention, there is provided an omnidirectional vehicle having at least three wheels steered in a given direction to allow the vehicle to travel in any direction, comprising: a body; a large-diameter steering gear horizontally mounted at a central portion of the body so as to be rotatable; a motor for driving the large-diameter steering gear; steering shafts numbering the same as the wheels, extending vertically around the large-diameter steering gear and adapted to rotatably support the wheels at lower ends of the steering shafts; and small-diameter steering gears numbering the same as the steering shafts and concentrically fixed to the steering shafts, respectively, to mesh with the large-diameter steering gear, the small-diameter steering gears being adapted to rotate the steering shafts upon rotation of the large-diameter steering gear, thereby changing a steering direction of the wheels supported by the steering shafts.

With this arrangement, all the wheels can be simultaneously steered upon only rotation of the large-diameter steering gear, and only one steering motor is required to rotate the large-diameter steering gear. Therefore, the number of steering motors, and hence the cost, can be reduced. Compared with the conventional omnidirectional vehicle having a plurality of synchronized steering motors, the steering control device is simple, since only one steering motor is used.

In the omnidirectional vehicle of the present invention, the large-diameter steering gear has toothed portions formed only on portions meshed with the small-diameter steering gears and the number of teeth in each one of the toothed portions is sufficient to finally direct the corresponding wheel in tangential direction of a circle passing through the all wheels.

With this arrangement, the wheels can be directed toward the tangential directions of the circle so as to pivot the vehicle.

When the omnidirectional vehicle of the present invention can be pivoted as described above, the large-diameter steering gear may have upper and lower large steering gears concentrically fixed to a single shaft, and the small-diameter steering gears are alternately meshed with the upper and lower large steering gears.

With this arrangement, unlike the case wherein all of a plurality of toothed portions meshed with all small-diameter steering gears are formed on only one large-diameter steering gear, space for making the toothed portions is not limited, thereby simplifying design of the large-diameter steering gear.

The omnidirectional vehicle having the arrangement described above may further comprises a wheel direction lock wheel and locked wheels. The wheel direction lock wheel is concentrically fixed to a drive shaft of the large-diameter steering gear so as to be rotated together therewith, and has projecting portions projecting radially outward from positions corresponding to the non-toothed portions of the large-diameter steering wheel. The locked wheels are concentrically fixed to the steering shafts to be rotated together therewith. The locked wheels are locked by corresponding one of the projecting portions of the wheel direction lock wheel when the wheels are steered in tangential directions of the circle passing the wheels, and the small-diameter steering wheels are disengaged from corresponding toothed portions of the large-diameter steering wheel.

With the above arrangement, the wheels steered in tangential directions can be locked upon pivoting.

When the omnidirectional vehicle has such a wheel direction lock rotating wheel and locked wheels, the wheel direction lock wheel may have upper and lower lock wheels concentrically fixed to a single shaft, and the locked wheels alternately face the upper and lower locked wheels.

With this arrangement, the wheel direction lock wheel can be easily designed for the same reason as that the large-diameter steering wheel comprises the upper and lower large steering gears.

In the omnidirectional vehicle of the present invention, the steering shafts may be constructed as hollow shafts, and the omnidirectional vehicle may further comprises: a large-diameter drive gear horizontally and rotatably mounted on the body so as to be concentric with the large-diameter steering gear; a drive source for driving the large-diameter drive gear; wheel drive shafts inserted in the holes of the hollow steering shafts so as to be rotatably supported by the hollow steering shafts; small-diameter drive gears meshed with the large-diameter drive gear and concentrically fixed to the wheel drive shafts to transmit rotational force from the large-diameter drive gear to the wheel drive shafts; and rotational force transmitting means for transmitting the rotational force from the wheel drive shafts to the corresponding wheels while allowing steering of the wheels.

With this arrangement, only one drive source is required. Compared with the arrangement using an independent motor to drive each wheel, the cost of the vehicle can be reduced.

The rotational force transmitting means may comprise a first bevel gear concentrically fixed to the axle of each wheel and a second bevel gear concentrically fixed to each drive shaft and meshed with the first bevel gear, thereby simplifying the rotational force transmitting means.

Figure 1:
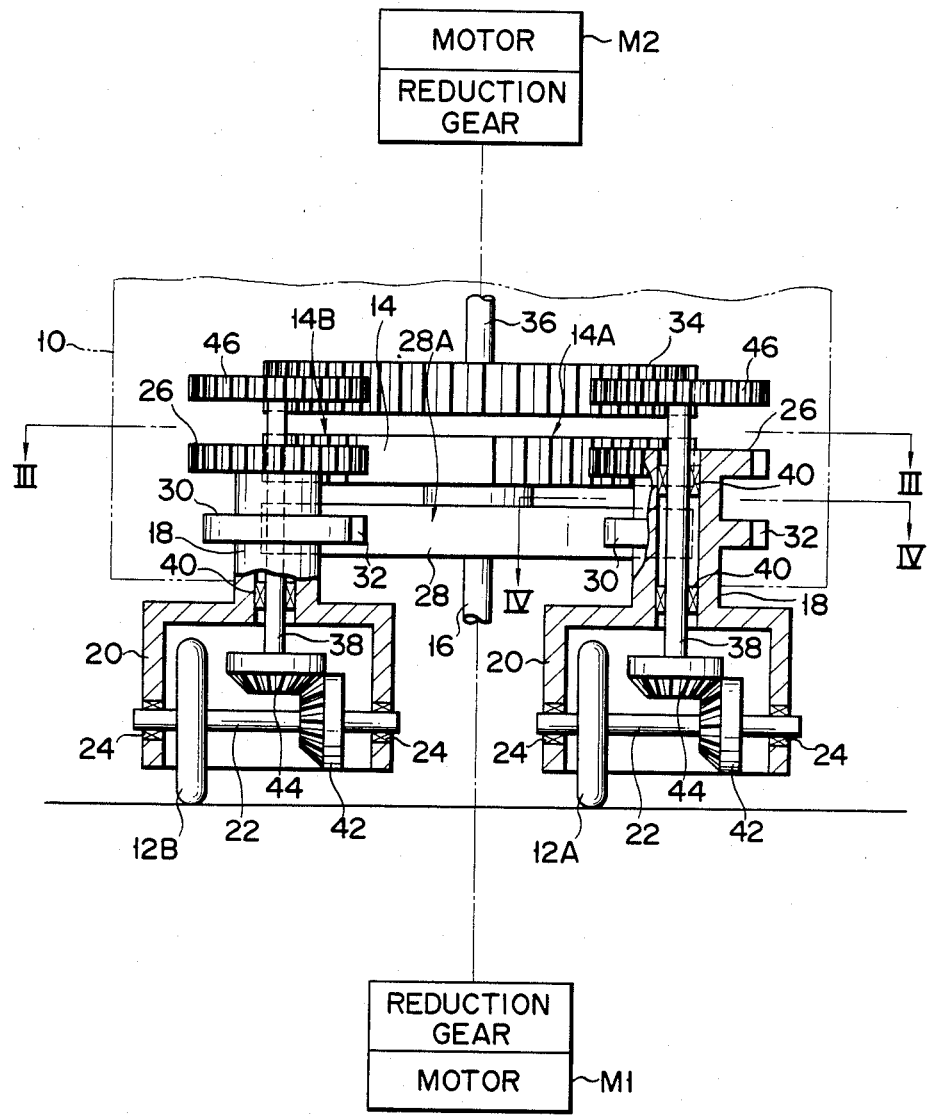
FIG. 1 is a schematic longitudinal sectional view of an omnidirectional vehicle according to an embodiment of the present invention.
Figure 2:
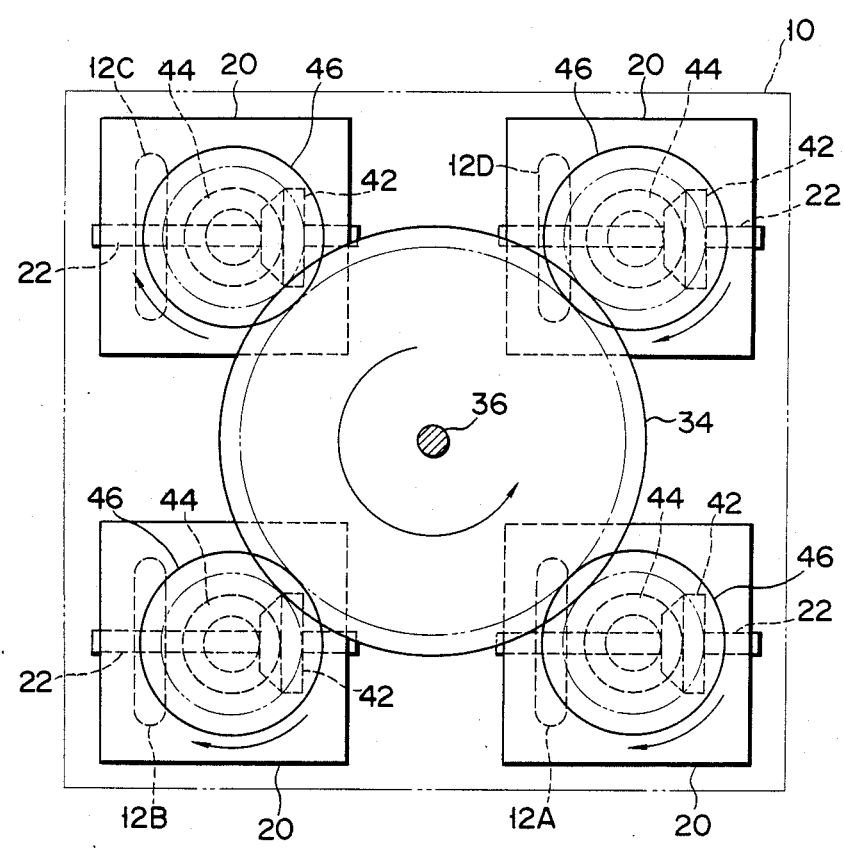
FIG. 2 is a schematic plan view of the omnidirectional vehicle shown in FIG. 1.

The present invention will be described with reference to the accompanying drawings.

DESCRIPTION OF THE PREFERRED EMBODIMENTS

A four-wheel omnidirectional vehicle according to an embodiment of the present invention will be described with reference to FIGS. 1 to 14. Reference numeral 10 denotes a body of the omnidirectional vehicle; and 12A to 12D, wheels. Wheels 12A to 12D are rubber wheels in this embodiment. Large-diameter steering gear 14 is horizontally mounted at the central portion of body 10 so as to be freely rotatable. Large steering gear 14 is concentrically connected with steering drive shaft 16 driven through a reduction gear by steering motor M1 mounted in body 10. Since motor M1 and the reduction gear are known to those skilled in the art, these are illustrated by blocks for the sake of simplicity. Reference numerals 18 denote steering shafts rotatably supported by bearings on body 10 and vertically extending around large steering gear 14. In this embodiment, steering shafts 18 are hollow shafts. Axle supports 20 rotated together with steering shafts 18 are mounted at the lower ends of steering shafts 18. Axles 22 of wheels 12A to 12D are supported by axle supports 20 through bearings 24. Wheels 12A to 12D are fixed to axles 22 away from the center of rotation of steering shafts 18 and are turned about steering shafts 18 upon rotation of steering shafts 18.

Small-diameter steering gears 26 having the same diameter each other and meshed with large steering gear 14 are concentrically fixed to the upper ends of steering shafts 18 so as to rotate with steering shafts 18. Small steering gears 26 cause the rotation of corresponding steering shafts 18 upon rotation of large steering gear 14. More specifically, when large steering gear 14 is rotated, steering shafts 18 are rotated through the same angle through small steering gears 26. Therefor, wheels 12A to 12D, supported by axle supports 20 of steering shafts 18 through axles 22, are rotated in the same direction through the same angle.

Figure 3:
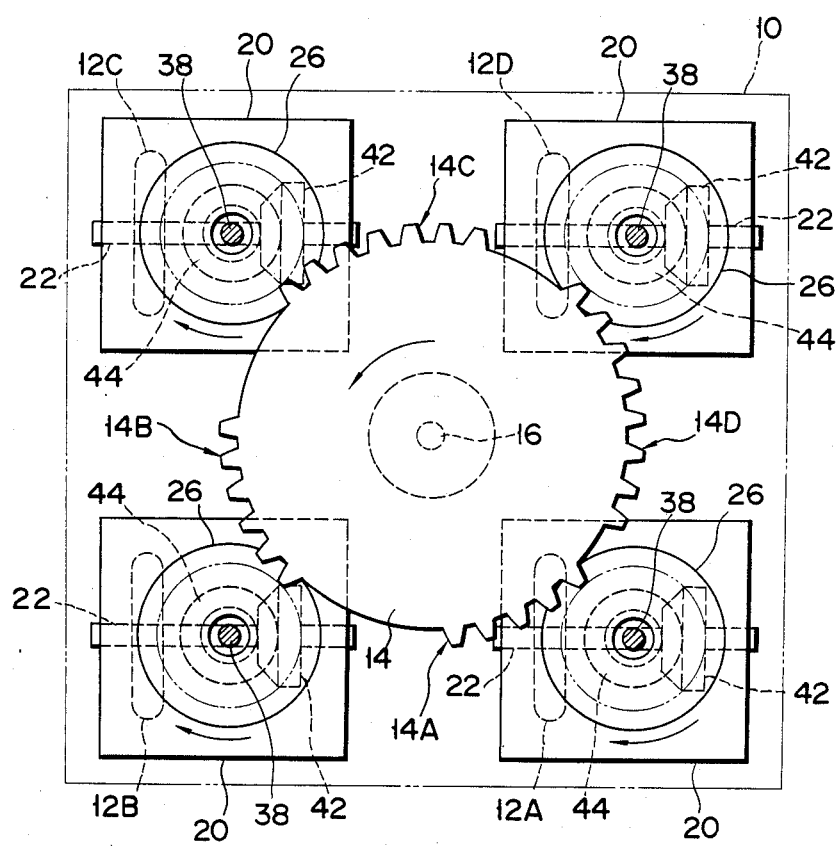
FIG. 3 is a sectional view of the vehicle in FIG. 1 taken along the line III—III thereof.

In this embodiment, as is best shown in FIG. 3, teeth are not formed around the entire circumference of large steering gear 14. Only four toothed portions 14A, 14B, 14C, and 14D each having a predetermined number of teeth are formed to mesh with corresponding small steering gears 26. The number of teeth of each of toothed portions 14A, 14B, 14C, and 14D of large steering gear 14 is determined by the angular distance between an initial position, where wheels 12A, 12B, 12C, and 12D are aligned in the back-and-forth direction of body 10 (i.e., each of small steering gears 26 is meshed with one end of a corresponding one of toothed portions 14A, 14B, 14C, and 14D of large steering gear 14, i.e., the leading end of each of toothed portions 14A, 14B, 14C, and 14D upon counterclockwise rotation of large steering gear 14), and a position where wheels 12A, 12B, 12C, and 12D are rotated in the state shown in FIG. 14. In the position shown in FIG. 14, each small steering gear 26 is meshed with the other end (the trailing end of each of toothed portions 14A, 14B, 14C, and 14D upon counterclockwise rotation of large steering gear 14) of a corresponding one of portions 14A, 14B, 14C, and 14D of gear 14.

More specifically, the number of teeth of toothed portion 14A meshed with the corresponding small steering gear 26 for turning first wheel 12A is determined so as to cause first wheel 12A to turn through 225° (180°+45°) from the initial position shown in FIG. 3 in the direction of the arrow (clockwise direction). Similarly, the number of teeth of toothed portion 14B meshed with the corresponding small steering gear 26 for turning second wheel 12B is determined so as to cause second wheel 12B to turn through 315° (225°, i.e., the steering angle of first wheel 12A, +90°) from the initial position in the direction of the arrow (clockwise direction). The number of teeth of toothed portion 14C meshed with the corresponding small steering gear 26 for turning third wheel 12C is determined so as to cause third wheel 12C to turn through 405° (315°, i.e., the steering angle of second wheel 12B, +90°) from the initial position in the direction of the arrow (clockwise direction). The number of teeth of toothed portion 14D meshed with the corresponding small steering gear 26 for turning fourth wheel 12D is determined so as to cause fourth wheel 12D to turn through 495° (405°, i.e., the steering angle of third wheel 12C, +90°) from the initial position in the direction of the arrow (clockwise direction).

When large steering gear 14 is rotated counter clockwise from the initial position shown in FIG. 3 as shown by the arrow, at first, all wheels 12A, 12B, 12C, and 12D are simultaneously steered clockwise. When wheels 12A, 12B, 12C and 12D are steered through 225° (the state shown in FIG. 11) from the initial position shown in FIG. 3, only steering gear 26 for first wheel 12A is disengaged from toothed portion 14A of large steering gear 14, and first wheel 12A is no longer steered. When other wheels 12B, 12C, and 12D are steered clockwise through 315°, 405°, and 495°, respectively, the corresponding small steering gears 26 for other wheels 12B, 12C, and 12D are disengaged from corresponding toothed portions 14B, 14C, and 14D of large steering gear 14 and are stopped, successively.

Figure 4:
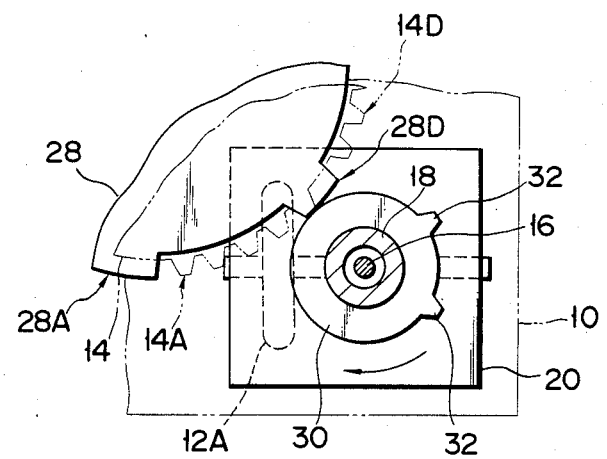
FIG. 4 is an enlarged sectional view showing the first wheel and its peripheral portion in the section taken along the line IV—IV of FIG. 1, in which the first wheel is located in the initial position shown in FIG. 2.
Figure 5:
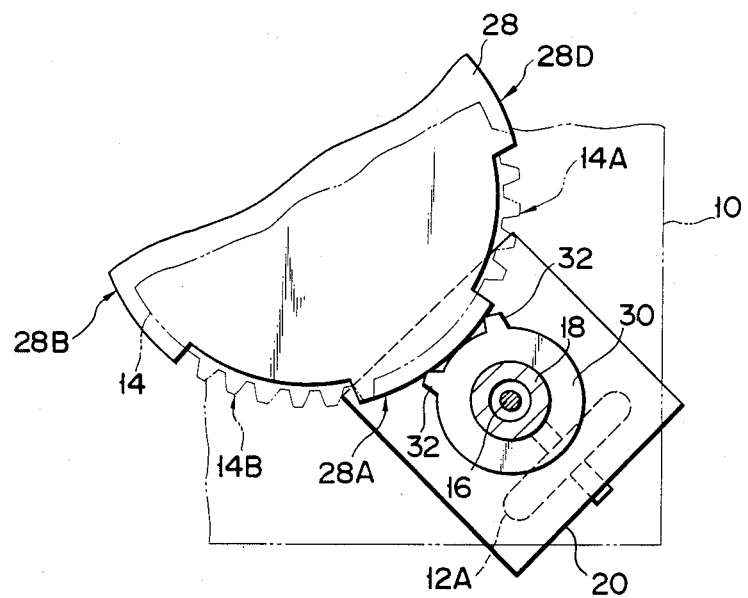
FIG. 5 is an enlarged sectional view showing the first wheel and its peripheral portion in the section taken along the line IV—IV of FIG. 1, in which the first wheel is steered from the initial position shown in FIG. 2 clockwise through 225 degrees.

Reference numeral 28 denotes a wheel direction lock wheel concentrically fixed to steering drive shaft 16 so as to rotate together with large steering gear 14. Wheel 28 has substantially the same diameter as that of large steering gear 14. As shown in FIGS. 4 and 5, lock wheel 28 has projecting portions 28A to 28D on its peripheral surface corresponding to nontoothed portions defined between toothed portions 14A, 14B, 14C, and 14D of large steering gear 14. Projecting portions 28A to 28D project radially outward from the peripheral surface of lock wheel 28. Projected end faces of projecting portions 28A to 28D are formed as arcs of a circle having the center of rotation of lock wheel 28 as its center.

Locked wheel 30 is fixed to a position on the steering shaft 18, where locked wheel 30 faces the peripheral surface of lock wheel 28, so as to be concentric with and rotate with each steering shaft 18. The diameter of peripheral surface of each locked wheel 30 is determined such that the peripheral surface of wheels 30 are brought into rolling contact with the corresponding end faces of projecting portions 28A to 28D of lock wheel 28 or slightly spaced apart therefrom. A pair of small projections 32 are formed on the peripheral surface of each of locked wheels 30 at a side symmetrical with a corresponding one of wheels 12A, 12B, 12C, and 12D so as to interpose the corresponding one of steering shafts 18. Projections 32 are spaced apart by a predetermined distance along the circumferential direction of locked wheels 30. The predetermined distance and the length of projections 32 are determined such that the pair of projections 32 can be simultaneously brought into sliding contact with the end faces of the corresponding one of projecting portions 28A to 28D of lock wheel 28, as shown in FIG. 5. Each locked wheel 30 is rotated clockwise from the initial position shown in FIG. 3 together with the corresponding small steering gear 26. When each small steering gear 26 is disengaged from the corresponding one of toothed portions 14A, 14B, 14C, and 14D and stopped, the peripheral surface portion between projection 32 is brought into rolling contact with or opposes the end face of the corresponding one of projecting portions 28A, 28B, 28C, and 28D, as shown in FIG. 5. At this time, distal ends of the pair of projections 32 are simultaneously brought into contact with the end face of the corresponding one of projecting portions 28A, 28B, 28C, or 28D to prevent further rotation of the corresponding steering shaft 18 (the corresponding one of wheels 12A to 12D is no longer rotated about the corresponding shaft 18).

For example, when small steering gear 26 for first wheel 12A is rotated clockwise through 225° from the initial position shown in FIG. 3 and is disengaged from toothed portion 14A of large steering gear 14, the end face of projecting portion 28A of lock wheel 28 is brought into contact with or opposes the portion of peripheral surface of the corresponding locked wheel 30 between projections 32. In this state, since the end faces of projections 32 are simultaneously in contact with the end face of projecting portion 28A of lock wheel 28, as shown in FIG. 5, this locked wheel 30 cannot be rotated. Steering shaft 18 for first wheel 12A and hence first wheel 12A are locked. Wheel locking is performed for other wheels 12B, 12C, and 12D in the same manner as described above. The circumferential length of each end face of the projecting portions 28A to 28C of lock wheel 28 is sufficient to continuously lock locked wheels 30 corresponding to first to third wheels 12A, 12B, and 12C (i.e., sufficient to continuously allow simultaneous contact of projections 32 of locked wheels 30 for wheels 12A, 12B, and 12C with projecting portions 28A, 28B, and 28C) until locked wheel 30 corresponding to fourth wheel 12D is locked by projecting portion 28D of lock wheel 28. Large steering gear 14 is rotated until wheels 12A, 12B, 12C, and 12D are brought to the state in FIG. 14. After the fourth wheel 12D is locked, steering motor M1 is stopped, and then large steering gear 14 and lock wheel 28 are stopped. Therefore, the steering directions of wheels 12A, 12B, 12C, and 12D are locked in the state shown in FIG. 14.

Referring back to FIGS. 1 and 2, reference numeral 34 denotes a large-diameter drive gear horizontally arranged above large steering gear 14. Large drive gear 34 has teeth around its entire circumference and the same diameter as that of large steering gear 14. Large drive gear 34 is rotatably supported by body 10 so as to be concentric with large steering gear 14. Large drive gear 34 is concentrically connected with power shaft 36, driven through a reduction gear by drive motor M2 mounted in body 10.

Reference numerals 38 denote wheel drive shafts vertically inserted in inner holes of steering shafts 18, respectively. Axle drive shafts 38 are rotatably supported by bearings 40 arranged in the inner holes of steering shafts 18. Second bevel gears 44, meshed with first bevel gears 42 fixed to axles 22, are concentrically fixed to the lower ends of wheel drive shafts 38. Small-diameter drive gears 46, having equal diameters each other and meshed with large drive gear 34, are concentrically fixed to the upper ends of wheel drive shafts 38. Small drive gears 46 transmit the rotational force from large drive gear 34 to the corresponding wheels 12A, 12B, 12C, and 12D through the corresponding wheel drive shafts 38, first and second bevel gears 42 and 44, and axles 22. Since small drive gears 46 are rotated at a constant speed in the same direction, wheels 12A, 12B, 12C, and 12D are rotated at the same speed in the same direction.

In the omnidirectional vehicle of this embodiment, rotation of large drive gear 34 in one or the other direction by drive motor M2 causes all wheels 12A, 12B, 12C, and 12D to rotate simultaneously at a constant speed in one direction or the other direction. Also in the omnidirectional vehicle, upon rotation of large steering gear 14 in one or the other direction by motor M1, wheels 12A, 12B, 12C, and 12D are steered. In this manner, the omnidirectional vehicle can be driven while changing its steering direction.

Figure 6:
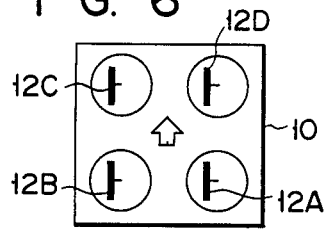
FIGS. 6 to 14 are charts showing various patterns of four wheels for setting the moving direction in the omnidirectional vehicle of FIG. 1.
Figure 11:
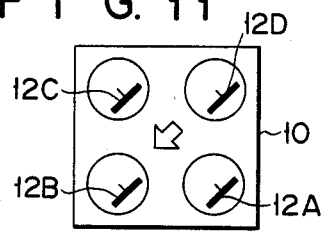
Figure 7:
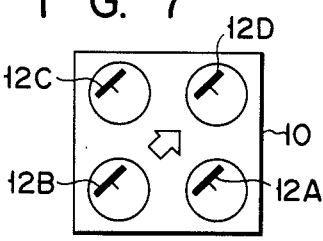
Figure 12:
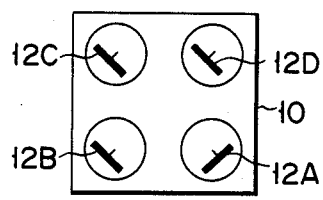
Figure 8:
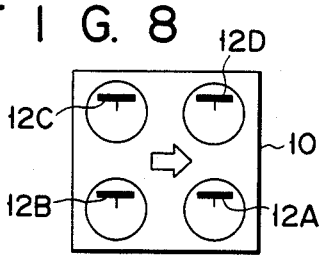
Figure 13:
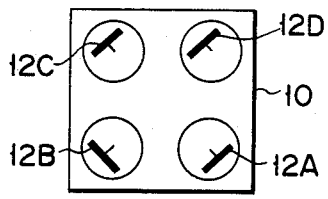
Figure 9:
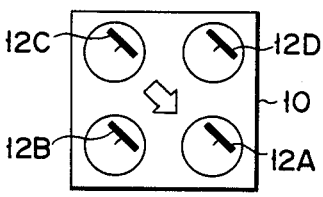

The procedure for changing the steering direction of the omnidirectional vehicle will be described below. FIGS. 6 to 14 show various wheel patterns. FIG. 6 shows the state of wheels 12A, 12B, 12C, and 12D for travel in the forward direction (upper direction in FIG. 6). In this case, wheels 12A, 12B, 12C, and 12D are directed in the back-and-forth direction (upper-and-lower direction of FIG. 6) of body 10, i.e., the initial state.

Moving direction of the vehicle is turned through the counterclockwise rotation of the large steering gear 14 by steering motor M1. When large steering gear 14 is rotated counterclockwise, all small steering gears 26 are simultaneously rotated clockwise to cause all wheels 12A, 12B, 12C, and 12D to simultaneously turn in the same direction until the rotational angle of each small steering gear 26 reaches 225°. As a result, when the rotational angle of large steering gear 14 is adjusted during the rotation of all small steering gears 26 between 0° and 225°, the omnidirectional vehicle can be driven in a desired direction without changing the position of body 10. FIGS. 7 to 11 show states of four wheels 12A, 12B, 12C, and 12D when the moving direction of the vehicle is changed without changing the position of body 10. In the state shown in FIG. 7, the vehicle can travel in the front right direction. In this case, all small steering gears 26 are rotated clockwise through 45° from the initial position shown in FIG. 6. In the state shown in FIG. 8, the vehicle can travel in the right direction, wherein all small steering gears 26 are rotated clockwise through 90° from the initial position shown in FIG. 6. In the state shown in FIG. 9, the vehicle can travel in the back right direction, wherein all small steering gears 26 are rotated clockwise through 135° from the initial position shown in FIG. 6. In the state shown in FIG. 10, the vehicle can travel backwards, wherein all small steering gears 26 are rotated clockwise through 180° from the initial position shown in FIG. 6. In the state shown in FIG. 11, the vehicle can travel in the back left direction, wherein all small steering gears 26 are rotated clockwise through 225° from the initial position shown in FIG. 6.

Change of the travelling or moving direction of the vehicle for moderate curves can be done while the vehicle is moving. However, when the travelling direction is to be changed at an acute angle, the vehicle must be stopped (i.e., drive motor M2 is stopped).

The omnidirectional vehicle can be pivoted at a given position in the following manner.

The vehicle is stopped at the pivot position. Then, steering motor M1 is driven to rotate large steering gear 14 counterclockwise. Pivot movement can be started from any of the states shown in FIGS. 6 to 11.

Figure 14:
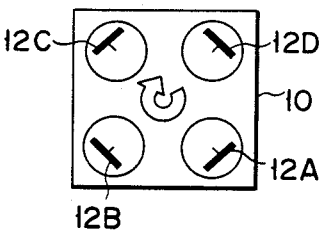
Figure 10:
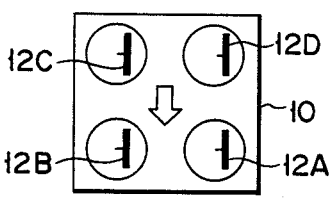

After the clockwise rotation of 225° of all small steering gears 26 from the initial position of FIG. 6 (i.e., wheels 12A, 12B, 12C, and 12D are turned from their initial positions shown in FIG. 6 to the positions shown in FIG. 14) by the counterclockwise rotation of large steering gear 14, small steering gear 26 for first wheel 12A is disengaged from toothed portion 14A of large steering gear 14, and turning of first wheel 12A about steering shaft 18 is stopped. At the same time, locked wheel 30 corresponding to first wheel 12A is locked by projecting portion 28A of lock wheel 28, and thus the direction of first wheel 12A is locked. Other wheels 12B, 12C, and 12D continue to turn about their corresponding steering shafts 18 upon counterclockwise rotation of large steering gear 14. After wheels 12B, 12C, and 12D reach the positions shown in FIG. 12 (wheels 12B, 12C, and 12D are further rotated through 90° from the position where first wheel 12A is locked), small steering gear 26 corresponding to second wheel 12B is disengaged from toothed portion 14B of large steering gear 14, and turning of second wheel 12B about the corresponding steering shaft 18 is stopped. At the same time, locked wheel 30 corresponding to second wheel 12B is locked by projecting portion 28B of lock wheel 28, and thus the direction of second wheel 12B is locked. Similarly, when third wheel 12C is rotated through 90° from the position where second wheel 12B is locked, it reaches the position shown in FIG. 13 and is locked. When fourth wheel 12D is further rotated through 90° from the position where rotation of wheel 12C about the corresponding steering shaft 18 is stopped, it reaches the position shown in FIG. 14, and turning of fourth wheel 12D about the corresponding steering shaft 18 is stopped in the position shown in FIG. 14.

In this manner, when wheels 12A, 12B, 12C, and 12D are turned to the positions where they are located outside the corresponding steering shafts 18 (the state shown in FIG. 14), all wheels 12A, 12B, 12C, and 12D are located at an equal distance from the center of rotation of large steering gear 14. At the same time, all wheels 12A, 12B, 12C, and 12D are directed along the tangential directions of the circle having the same center of rotation as gear 14 and passing through wheels 12A, 12B, 12C and 12D.

In this position, drive motor M2 is driven to rotate wheels 12A, 12B, 12C, and 12D at the same speed in the same direction, and the vehicle is pivoted at the stop position. This pivotal rotation allows the vehicle to perform a U-turn.

In order to move the vehicle after pivotal rotation, steering motor M1 is rotated in the reverse direction to rotate large steering gear 14 and lock wheel 28 in the reverse direction. Reverse rotation of large steering gear 14 and lock wheel 28 causes sequential release of lock wheels 28 from projecting portions 28D to 28A, and hence wheels 12D, 12C, 12B, and 12A. At the same time, toothed portions 14D to 14A of large steering gear 14 are sequentially meshed with small steering gears 26 corresponding to wheels 12D, 12C, 12B, and 12A. Wheels 12D to 12A are sequentially turned in the reverse direction around the corresponding steering shafts 18 and return to the states in which all wheels 12D to 12A direct in the same direction as shown in FIGS. 6 to 11.

In the omnidirectional vehicle of this type, large steering gear 14 driven by steering motor M1 is horizontally mounted at the center of body 10. The same number of steering shafts 18 as that of wheels 12A to 12D are vertically mounted around large steering gear 14. Axles 22 of wheels 12A, 12B, 12C and 12D are supported by the lower ends of steering shafts 18. Small steering gears 26, meshed with large steering gear 14 so as to rotate together with steering shafts 18 upon rotation of large steering gear 14 and to change the steering directions of the wheels, are mounted on steering shafts 18. Therefore, only one steering motor is required, unlike in conventional omnidirectional vehicles which require many steering motors, and manufacturing cost can be reduced. In addition, compared with conventional omnidirectional vehicles using a plurality of steering motors, steering control can be simplified.

In an omnidirectional vehicle having the above arrangement, large steering gear 14 has toothed portions 14A to 14D, each of which number of teeth is sufficient to direct wheels 12A to 12D in the tangential directions of the circle passing through the wheels, only at the circumferential portions thereof meshed with small steering gears 26. Wheels 12A to 12D are thus able to be directed in the tangential directions of the circle, so that the vehicle can be pivoted. Also in the omnidirectional vehicle having the above arrangement, lock wheel 28 is concentrically fixed to steering drive shaft 16 of large steering gear 14 so as to rotate together with large steering gear 14, and locked wheels 30 are concentrically fixed to the corresponding steering shafts 18. When all wheels 12A to 12D are directed in the tangential directions of the circle stated above and small steering gears 26 are disengaged from corresponding toothed portions 14A to 14D of large steering gear 14, locked wheels 30 are brought into slidable contact with projecting portions 28A to 28D of lock wheels 28 so as to be locked by the corresponding projecting portions. Therefore, wheels 12A to 12D can be locked in a state in which all wheels 12A to 12D are directed in tangential directions of the circle during the pivotal rotation.

Furthermore, in the omnidirectional vehicle having the arrangement described above, large drive gear 34 driven by drive motor M2 mounted so as to be concentric with large steering gear 14. Steering shafts 18 are constructed as hollow shafts, and wheel drive shafts 38 are respectively inserted in the holes in steering shafts 18. Small drive gears 46 meshed with large drive gear 34 are concentrically fixed to drive shafts 38 so as to be rotated together with drive shafts 38 upon rotation of large drive gear 34 and to cause the corresponding wheels 12A to 12D to rotate. Therefore, only one driving motor is required. As compared with the conventional case wherein the wheels are driven by separate motors, the price of the vehicle can be reduced.

Figure 15:
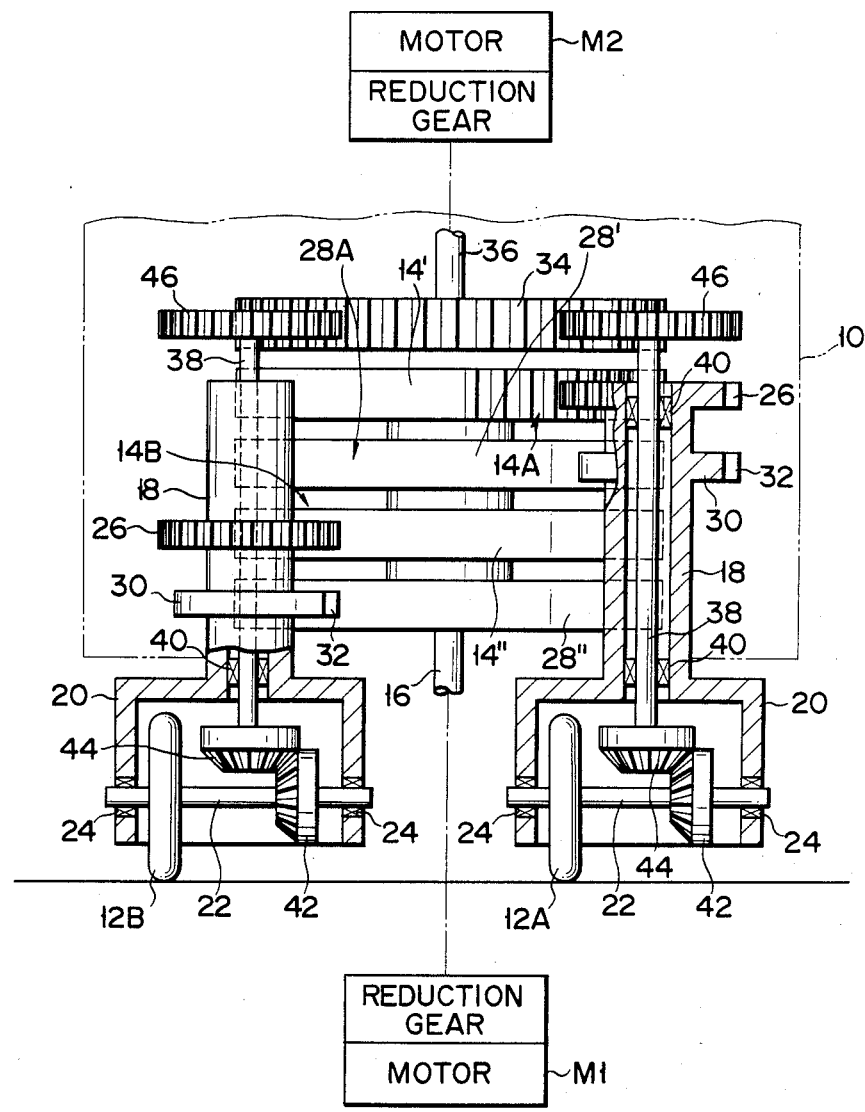
FIG. 15 is a schematic longitudinal sectional view of an omnidirectional vehicle according to another embodiment of the present invention.

FIG. 15 shows an omnidirectional vehicle according to another embodiment of the present invention. In this embodiment, the large-diameter steering gear and the wheel direction lock wheel are constituted by upper and lower large steering gears 14' and 14" and upper and lower lock wheels 28' and 28", respectively, upper and lower large steering gears 14' and 14" being concentrically fixed to a common shaft, and upper and lower lock wheels 28' and 28" also being concentrically fixed to another common shaft. Small-diameter steering gears 26 are alternately meshed with upper and lower large steering gears 14' and 14", and locked wheels 30 are alternately faced to upper and lower lock wheels 28' and 28". According to this embodiment, compared with the first embodiment described above wherein all toothed portions 14A to 14D meshed with small steering gears 26 are formed on only one large steering gear 14, space for forming toothed portions 14A to 14D on the large steering gear 14 is not limited. Therefore, the design of the large-diameter steering gear can be simplified. Design of the wheel direction lock wheel can also be simplified.

In the previous embodiments, the directions of wheels 12A to 12D are locked when the vehicle is pivoted. Lock of all wheels 12A to 12D need not be locked always. In the previous embodiments, a U-turn is performed by pivotal rotation of the vehicle. However, when drive motor M2 is rotated in the reverse direction, the vehicle can be driven in the reverse direction in the wheel patterns shown in FIGS. 7 to 10. If the radius of turning of the vehicle is large, change of the wheel pattern from one shown in FIG. 6 to one in FIG. 10 causes the vehicle to drive in the reverse direction with the rotation of drive motor M2 in one direction. Furthermore, if pivotal rotation is not required, large steering gear 14 may have teeth for small steering gears around its entire circumference.

In the above embodiments, all wheels 12A to 12D are driven by single drive motor M2. However, another driving means for wheels 12A to 12D may be utilized. Furthermore, it is possible to drive only two wheels (e.g., 12A and 12C) instead of all four wheels 12A to 12D.

The above embodiments exemplify four-wheel vehicles. However, the present invention can be applied to any omnidirectional vehicle with at least three wheels.

What is claimed is:

1. An omnidirectional vehicle having at least three wheels which can be steered in a given direction to allow the vehicle to travel in any direction, comprising:
   a body;
   a large-diameter steering gear horizontally mounted at a central portion of said body so as to be rotatable, wherein said large-diameter steering gear has toothed portions formed only on portions meshed with said small-diameter steering gears and the number of teeth in each one of said toothed portions is sufficient to finally direct said corresponding wheel in tangential direction of a circle passing through all of said at least three wheels;
   a motor for driving said large-diameter steering gear;
   steering shafts numbering the same as said wheels, extending vertically around said large-diameter steering gear and adapted to rotatably support said wheels at lower ends of said steering shafts;
   small-diameter steering gears numbering the same as said steering shafts and concentrically fixed to said steering shafts, respectively, so as to mesh with said large-diameter steering gear and adapted to rotate said steering shafts upon rotation of said large-diameter steering gear to change the steering directions of said wheels supported by said steering shafts;
   a wheel direction lock wheel concentrically fixed to a drive shaft of said large-diameter steering gear so as to be rotated together therewith and having projecting portions projecting radially outward from positions located between said toothed portions; and
   locked wheels concentrically fixed to said steering shafts to be rotated together therewith and adapted to be prevented from rotating by said projecting portions of said wheel direction lock wheel when said small-diameter steering gears are disengaged from said corresponding toothed portions of said large-diameter steering gear.

2. A vehicle according to claim 1, wherein said large-diameter steering gear comprises upper and lower large steering gears concentrically fixed to a single shaft, and said small-diameter steering gears are alternately meshed with said upper and lower large steering gears.

3. A vehicle according to claim 1, wherein
   said large-diameter steering gear comprises upper and lower large steering gears concentrically fixed to a single shaft, and said small-diameter steering gears are alternately meshed with said upper and lower large steering gears; and
   said wheel direction lock wheel comprises upper and lower lock wheels concentrically fixed to a single shaft, and said locked wheels alternately face said upper and lower lock wheels.

4. A vehicle according to claim 1, wherein each one of said steering shafts is a hollow shaft, and further comprising:

a large-diameter drive gear horizontally and rotatably mounted on said body so as to be concentric with said large-diameter steering gear;

a drive source for driving said large-diameter drive gear;

wheel drive shafts inserted in holes of said hollow steering shafts so as to be rotatably supported by said hollow steering shafts;

small-diameter drive gears meshed with said large-diameter drive gear and concentrically fixed to said wheel drive shafts to transmit rotational force from said large-diameter drive gear to said wheel drive shafts; and rotational force transmitting means for transmitting the rotational force from said wheel drive shafts to said corresponding wheels while allowing steering of said wheels.

5. A vehicle according to claim 4, wherein said rotational force transmitting means comprises first bevel gears concentrically fixed to the axles of said wheels and second bevel gears concentrically fixed to said wheel drive shafts and meshed with said first bevel gears.

6. A vehicle according to claim 5, wherein said large-diameter steering gear comprises upper and lower large steering gears concentrically fixed to a single shaft, and said small-dimater steering gears are alternately meshed with said upper and lower large steering gears.

7. A vehicle according to claim 5, wherein said large-diameter steering gear comprises upper and lower large steering gears concentrically fixed to a single shaft, and said small-diameter steering gears are alternately meshed with said upper and lower large steering gears; and said wheel direction lock wheel comprises upper and lower lock wheels concentrically fixed to a single shaft, and said locked wheels alternately face said upper and lower lock wheels.

8. A vehicle according to claim 4, wherein said large-diameter steering gear comprises upper and lower large steering gears concentrically fixed to a single shaft, and said small-diameter steering gears are alternately meshed with said upper and lower large steering gears; and said wheel direction lock wheel comprises upper and lower lock wheels concentrically fixed to a single shaft, and said locked wheels alternately face said upper and lower lock wheels.

9. A vehicle according to claim 1, wherein said large-diameter steering gear comprises upper and lower large steering gears concentrically fixed to a single shaft, and said small-diameter steering gears are alternately meshed with said upper and lower large steering gears.

10. An omnidirectional vehicle having at least three wheels which can be steered in a given direction to allow the vehicle to travel in any direction, comprising:

a body;

a large-diameter steering gear horizontally mounted at a central portion of said body so as to be rotatable;

a motor for driving said large-diamter steering gear;

steering shafts numbering the same as said wheels, extending vertically around said large-diameter steering gear and adapted to rotatably support said wheels at lower ends of said steering shafts, each of said steering shafts being a hollow shaft;

small-diameter steering gears numbering the same as said steering shafts and concentrically fixed to said steering shafts, respectively, so as to mesh with said large-diameter steering gear and adapted to rotate said steering shafts upon rotation of said large-diameter steering gear to change the steering directions of said wheels supported by said steering shafts;

a large-diameter drive gear horizontally and rotatably mounted on said body so as to be concentric with said large-diameter steering gear;

a drive source for driving said large-diameter drive gear;

wheel drive shafts inserted in holes of said hollow steering shafts so as to be rotatably supported by said hollow steering shafts;

small-diameter drive gears meshed with said large-diameter drive gear and concentrically fixed to said wheel drive shafts to transmit rotational force from said large-diameter drive gear to said wheel drive shafts; and rotational force transmitting means for transmitting the rotational force from said wheel drive shafts to said corresponding wheels while allowing steering of said wheels.

11. A vehicle according to claim 10, wherein said rotational force transmitting means comprises first bevel gears concentrically fixed to the axles of said wheels and second bevel gears concentrically fixed to said wheel drive shafts and meshed with said first bevel gears.

12. A vehicle according to claim 11, wherein said large-diameter steering gear has toothed portions formed only on portions meshed with said small-diameter steering gears and the number of teeth in each one of said toothed portions is sufficient to finally direct said corresponding wheel in tangential direction of a circle passing through all of said at least three wheels.

13. A vehicle according to claim 12, wherein said large-diameter steering gear comprises upper and lower large steering gears concentrically fixed to a single shaft, and said small-diameter steering gears are alternately meshed with said upper and lower large steering gears.

14. A vehicle according to claim 13, wherein said large-diameter steering gear comprises upper and lower large steering gears concentrically fixed to a single shaft, and said small-diameter steering gears are alternately meshed with said upper and lower large steering gears; and said wheel direction lock wheel comprises upper and lower lock wheels concentrically fixed to a single shaft, and said locked wheels alternately face said upper and lower lock wheels.

15. A vehicle according to claim: 12, further comprising:

a wheel direction lock wheel concentrically fixed to a drive shaft of said large-diameter steering gear so as to be rotated together therewith and having projecting portions radially projecting outward from positions located between said toothed portions; and locked wheels concentrically fixed to said steering shafts to be rotated together therewith and adapted to be prevented from rotating by said projecting portions of said wheel diredtion lock wheel when said small-diameter steering gears are disengaged from said corresponding toothed portions of said large-diameter steering gear.

16. A vehicle according to claim 10, wherein said large-diameter steering gear has toothed portions formed only on portions meshed with said small-diameter steering gears and the number of teeth in teeth in each of said toothed portions is sufficient to finally direct said corresponding wheel in tangential direction of a circle passing through all of said at least three wheels.

17. A vehicle according to claim 16, wherein said large-diameter steering gear comprises upper and lower large steering gears concentrically fixed to a single shaft, and said small-diameter steering gears are alternately meshed with said upper and lower large steering gears.

18. A vehicle to claim 16, further comprising:
a wheel direction lock wheel concentrically fixed to a drive shaft of said large-diameter steering gear so as to be rotated together therewith and having projecting portions projecting radially outward from positions located between said toothed portions; and
locked wheels concentrically fixed to said steering shafts to be rotated together therewith and adapted to be prevented from rotating by said projecting portions of said wheels direction lock wheel when said small-diameter steering gears are disengaged from said corresponding toothed portions of said large-diameter steering gear.

19. A vehicle according to claim 18, wherein said large-diameter steering gear comprises upper and lower large steering gears concentrically fixed to a single shaft, and said small-diameter steering gears are alternately meshed with said upper and lower large steering gears; and
said wheel direction lock wheel comprises upper and lower lock wheels concentrically fixed to a single shaft, and said locked wheels alternately face said upper and lower lock wheels.

* * * * *